(12) United States Patent
Jacobs et al.

(10) Patent No.: US 7,080,164 B2
(45) Date of Patent: Jul. 18, 2006

(54) PERIPHERAL DEVICE HAVING A PROGRAMMABLE IDENTIFICATION CONFIGURATION REGISTER

(75) Inventors: Paul A. Jacobs, Millbury, MA (US); Eric J. DeHaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 10/669,806

(22) Filed: Sep. 23, 2003

(65) Prior Publication Data

US 2005/0066073 A1    Mar. 24, 2005

(51) Int. Cl.
*G06F 3/00* (2006.01)
*G06F 13/36* (2006.01)

(52) U.S. Cl. .............................. 710/8; 710/10; 710/306
(58) Field of Classification Search ............. 710/8–14, 710/104, 305, 306, 313; 713/1, 2, 100
See application file for complete search history.

(56) References Cited

U.S. PATENT DOCUMENTS

| 5,383,143 | A | * | 1/1995 | Crouch et al. ............... 708/254 |
| 5,764,995 | A | * | 6/1998 | DeRoo et al. ............... 710/200 |
| 5,948,076 | A | * | 9/1999 | Anubolu et al. ................ 710/8 |
| 6,572,384 | B1 | * | 6/2003 | Marchevsky .................. 439/43 |
| 6,611,912 | B1 | * | 8/2003 | Maleck et al. .............. 713/100 |

* cited by examiner

*Primary Examiner*—Kim Huynh
*Assistant Examiner*—David Martinez
(74) *Attorney, Agent, or Firm*—Blakely, Sokoloff, Taylor & Zafman LLP (57) ABSTRACT

Methods and apparatuses for programming identifications of a peripheral device are described herein. According to one embodiment, the exemplary method includes programming, based on predefined data, one or more fields of configuration registers of a peripheral device in response to a configuration cycle of a data processing system, the one or more fields of the configuration registers including at least one identification register for identifying the peripheral device. Other methods and apparatuses are also described.

27 Claims, 6 Drawing Sheets

| Byte offset | Description |
|---|---|
| 00h | [7:6]1 0b to enable serial pre-load<br>[5:0]0 00001b (load Vendor ID/Device ID/Device ID/Revision ID)　501<br>[5:0]0 00000b (Reserved) |
| 01h | Arbiter Control / Status[7:0] |
| 02h | Arbiter Control /S tatus[15:8] |
| 03h | 31154 Control Register 0 |
| 04h | 31154 Control Register 1[7:0] |
| 05h | 31154 Control Register 1[15:8] |
| 06h | 31154 Control Register 2[7:0] |
| 07h | 31154 Control Register 2[15:8] |
| 08h | Multi-Transaction Timer Register[7:0] |
| 09h | Multi-Transaction Timer Register[15:8] |
| 0Ah | Pre-Fetch Policy Register[7:0] |
| 0Bh | Pre-Fetch Policy Register[15:8] |
| 0Ch | P_SERR# Assertion Control Register[7:0] |
| 0Dh | P_SERR# Assertion Control Register[15:8] |
| 0Eh | Secondary IDSEL SelectR egister[7:0] |
| 0Fh | Secondary IDSEL SelectR egister[15:8] |
| 10h | Secondary IDSEL Fnct0 Enable Register[7:0] |
| 11h | Secondary IDSEL Fnct0 Enable Register[15:8] |
| 12h | GPIO Pin Configuration Register |
| 13h | GPIO Write One to Toggle Register |
| 14h | Opaque Memory Base and LimitR egister[7:0] |
| 15h | Opaque Memory Base and LimitR egister[15:8] |
| 16h | Opaque Memory Base and LimitR egister[23:16] |
| 17h | Opaque Memory Base and LimitR egister[31:24] |
| 18h | Opaque Memory Base Upper 32 Bits[7:0] |
| 19h | Opaque Memory Base Upper 32 Bits[15:8] |
| 1Ah | Opaque Memory Base Upper 32 Bits[23:16] |
| 1Bh | Opaque Memory Base Upper 32 Bits[31:24] |
| 1Ch | Opaque Memory LimitU pper 32 Bits[7:0] |
| 1Dh | Opaque Memory LimitU pper 32 Bits[15:8] |
| 1Eh | Opaque Memory LimitU pper 32 Bits[23:16] |
| 1Fh | Opaque Memory LimitU pper 32 Bits[31:24] |
| 20h | SlotN umber Register |
| 21h | Chassis Number Register |
| 22h | Power Management NextI tem Pointer:<br>Mustb e per-loaded with a value ofE 4h to expose VPD register block to software. |
| 23h | Power management Capabilities Register[15:8]<br>This register may be pre-loaded with high order bits [15:11]s et to 11111b indicating thatt he bridge supports PME# generation from any PM DState. This feature may be used to workaround a Windows 98 bridge power managemente rrata. |
| 24h | ID [7:0]<br>The Device ID and Vendor ID are only preloaded if SROM offset0 0h = 1000_0001.<br>Otherwise, offsets 24h-28h are ignored. |
| 25h | ID [15:8] |
| 26h | ID [23:16] |
| 27h | ID [31:24] |
| 28 | RID<br>The Revision ID is only preloaded ifS ROM offset0 0h = 1000_0001.<br>Otherwise,o ffsets 24h-28h are ignored. |
| 29h - 7Fh | Reserved. |
| 80h - 0FFh | Vital Productd ata (Read Only region). |
| 100h - 1FFh | Vital ProductD ata (Read /W rite region). |

PERIPHERAL DEVICE HAVING A PROGRAMMABLE IDENTIFICATION CONFIGURATION REGISTER

FIELD

Embodiments of the invention relate to computer devices; and more specifically, to peripheral devices having programmable identification registers.

BACKGROUND

Computer systems employ a wide variety of peripheral components or input/output (I/O) devices. For example, a typical computer system usually contains a monitor, a keyboard, a mouse, a floppy drive, a network controller, a disk drive or an array of disk drives, and, optionally, a printer. High performance computer systems such as servers have more complex I/O device requirements.

An example of a host processor of a computer system connected to I/O devices through a component bus is defined by the PCI (peripheral component interconnect) Local Bus Specification, published by the PCI Special Interest Group. During system initialization, the host processor loads a device driver for each PCI device on the PCI bus. A typical PCI device includes multiple configuration registers located within a configuration memory space of each respective PCI device. The configuration registers including identification registers, such as, for example, the vendor ID, device ID or revision register, are read by the device driver and the host system during the initialization or normal operations to identify the PCI device. Typically, the identification registers are hardwired to fixed values during the manufacturing processes of the PCI device and they are not modifiable by the device driver or the operating system (OS) of the host. As a result, a legacy device driver that is looking for specific identification of a PCI device will not work with a PCI device having different identification information, such as, a different vendor ID or a different device ID, etc.

BRIEF DESCRIPTION OF THE DRAWINGS

The invention may best be understood by referring to the following description and accompanying drawings that are used to illustrate embodiments of the invention. In the drawings:

FIG. 5 is a block diagram illustrating an exemplary loading sequence of predefined data according to one embodiment.

DETAILED DESCRIPTION

Methods and apparatuses for programming identifications of a peripheral device are described herein. According to one embodiment, a set of registers in a peripheral device of a data processing system, such as PCI or PCI/PCI bridge device, is implemented to allow a user (e.g., an individual, a reseller, a vendor, or a manufacturer, etc.) to write user definable data (e.g., customized configuration data rather than the default data) into one or more predefined fields of configuration registers of the peripheral device. The configuration registers include at least one identification register, such as a vendor ID, a device ID, and a revision ID register, and the defined data includes the data being written to the at least one identification register (also referred to as ID data). According to one embodiment, when a configuration cycle, such as an ID configuration cycle, is invoked by a data processing system, the ID data is reported instead of the normal default identification data.

According to one embodiment, during the initialization of the system, such as preset time, data from an external data source (e.g., serial ROM) containing the ID data, as well as the standard configuration information, is transferred to the peripheral device. In one embodiment, during the transfer of the ID data, the host processor (e.g., the microprocessor) is prevented from accessing the configuration registers until the ID data has been transferred and loaded in the peripheral device. A predefined bit pattern included in certain portion of the ROM data would allow the ID data to be written into the configuration registers including at least one identification register (e.g., vendor ID, device ID, and revision ID). The bit pattern may also be used to redirect ID configuration cycles to the registers containing the ID data.

Accordingly, a configuration cycle invoked to read the device ID then reads the ID data and reports itself to the system software (e.g., device driver or operating system) as the ID data defined by the user. In one embodiment, this ID data persists in the registers until the next initialization event (e.g., preset event), at which time the ID data is reloaded from the external source (e.g., SROM). The peripheral device may be a regular PCI device or a PCI-X device. Alternatively, the peripheral device may be a PCI bridge device coupling to an upstream primary bus and a downstream secondary bus. Furthermore, the peripheral device may be a PCI Express™ compatible device.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
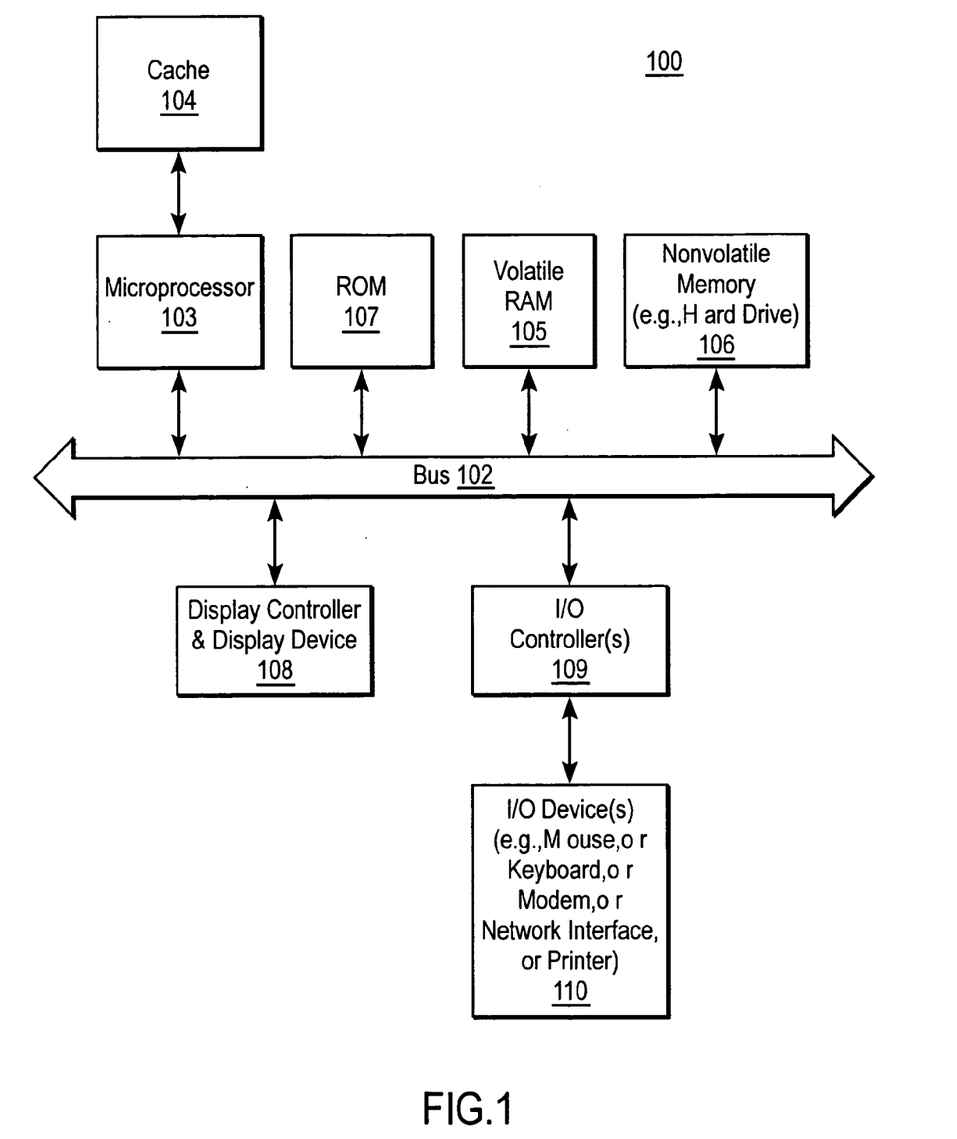
FIG. 1 is a block diagram illustrating an exemplary data processing system according to one embodiment.

FIG. 1 is a block diagram of an exemplary computer which may be used with an embodiment. For example, exemplary system 100 shown in FIG. 1 may perform the process shown in FIG. 6. Exemplary system 100 may include one or more peripheral devices having programmable identification registers for identifying the respective peripheral device, similar to those shown in FIGS. 2–4.

Note that while FIG. 1 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 1, the computer system 100, which is a form of a data processing system, includes a bus 102 which is coupled to a microprocessor 103 and a ROM 107, a volatile RAM 105, and a non-volatile memory 106. The microprocessor 103, which may be, for example, a Pentium processor from Intel Corporation or a PowerPC processor from Motorola, Inc., is coupled to cache memory 104 as shown in the example of FIG. 1. The bus 102 interconnects these various components together and also interconnects these components 103, 107, 105, and 106 to a display controller and display device 108, as well as to input/output (I/O) devices 110, which may be mice, keyboards, modems, network interfaces, printers, and other devices which are well-known in the art. Typically, the input/output devices 110 are coupled to the system through input/output controllers 109. The volatile RAM 105 is typically implemented as dynamic RAM (DRAM) which requires power continuously in order to refresh or maintain the data in the memory. The non-volatile memory 106 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers, and/or adapters, as is well-known in the art. In one embodiment, the I/O controller 109 includes a USB (Universal Serial Bus) adapter for controlling USB peripherals or a PCI controller for controlling PCI devices, which may be included in IO devices 110. In a further embodiment, I/O controller 109 includes an IEEE-1394 controller for controlling IEEE-1394 devices, also known as FireWire devices.

According to one embodiment, at least one of the PCI devices includes at least one programmable identification register, which may be programmed with predefined data. The predefined data may be stored in a memory within the respective PCI device, such as ROM or serial ROM (SROM). Alternatively, the predefined data may be stored in a system memory, such as ROM 107 or nonvolatile memory 106. According to one embodiment, during an initialization of system 100, such as booting, resetting, or bus re-enumeration of system 100, a configuration cycle, such as an ID configuration cycle, is invoked. During the configuration cycle, the predefined data for a peripheral device (e.g., PCI device) is read from a memory (e.g., SROM) and is used to program one or more configuration registers, including at least one identification register, such as, for example, vendor ID, device ID, and revision ID registers, of the respective peripheral device.

The configuration cycle may be carried out by system software, such as system software embedded within the chipset or processor, such as processor 103. Alternatively, the configuration cycle may be carried out by the BIOS (basic input and output system) or a device driver of an operating system (OS). The operating system may be a Windows operating system from Microsoft Corporation of Redmond, Wash. or a Mac OS from Apple Computer of Cupertino, Calif. Alternatively, the operating system may be a Linux or Unix operating system. Other operating systems, such as real-time embedded operating systems may be utilized.

According to one embodiment, the predefined data may be loaded in a sequence similar to the exemplary loading sequence 500 of FIG. 5. One or more bit patterns of the predefined data may be used to indicate whether the predefined data should be loaded, or alternatively, default data should be used. Once the predefined data has been loaded in the configuration registers of the peripheral device, the system may perform a verification of the configuration registers. For example, the programmed configuration registers may be read and compared with the predefined data stored in the memory to verify whether the respective configuration registers have been successfully configured. Once the configuration registers of the peripheral device is verified, the peripheral device may be enabled. Thereafter, the enabled peripheral device may report its predefined identity, rather than a default identity, to a system query. In one embodiment, once the peripheral device is enabled, the identification registers, such as vendor ID, device ID, and revision ID registers, may be configured as read-only registers, such that the enabled peripheral device operates in compliance with the associated specification, such as PCI specification.

With the programmable identification, according to one embodiment, a user may update a peripheral device or subsystem in implementations where the system software or device driver has been written to require a specific response to the ID configuration cycle (e.g., a vendor ID or a device ID cycle). This feature is typically useful where a specific device is no longer available and it is not possible to modify the system software or device drivers. By allowing the new device to "masquerade" as the previous device. For example, a customer could develop a modern functionality equivalent subsystem that identifies itself as a legacy device even though the legacy device has been obsoleted by the respective manufacturer. This could be accomplished without requiring modification to the operating system or device drivers. This will also allow the customers to extend the useful life of a system design beyond the end of life (EOL) of individual components.

In addition, according to one embodiment, a user may control the allowable devices permitted to be inserted into a system by requiring a specific identification (e.g., a vendor ID or a device ID, etc.) to be found. In the real-time mission critical systems, it would be possible to control the devices installed in the system by requiring the identification data fields of configuration registers to match the customer definable data. This could increase the overall reliability of a computing system by assuring only the validated devices are used in the system. The user may also use this feature in "branding" an option card to reflect the user's corporation, similar to re-labeling the peripheral device to match the vendor ID or device ID of the corporation.

Furthermore, a customer may implement a subsystem in a computing system that would "masquerade" as a standard device, which may be undetectable by normal user interaction. This could be used as a security device in monitoring system I/O activities or by activating a non-visible subsystem that could be triggered under the controlled circumstances. For example, a PCI device normally providing communication functionality could also contain a monitoring subsystem although it would report itself as a standard communication device.

Figure 2:
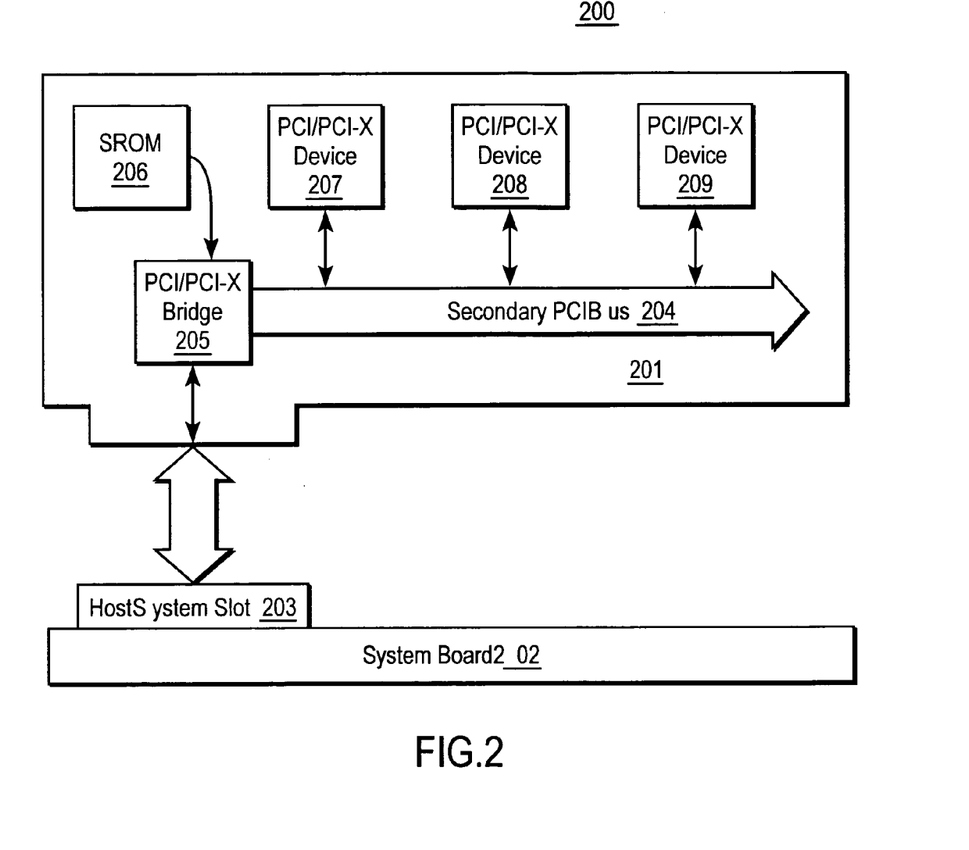
FIG. 2 is a block diagram illustrating an exemplary configuration containing one or more peripheral devices having a programmable identification registers according to one embodiment.

FIG. 2 is a block diagram illustrating an exemplary configuration including one or more peripheral devices having a programmable identification registers in accordance with one embodiment. In this embodiment, exemplary system 200 includes a plug-in card 201, also referred to as an option card, which may be plugged into host system slot 203, such as a primary PCI bus, of system board 202 (e.g., motherboard of exemplary system 100 of FIG. 1). In one embodiment, option card 201 includes one or more peripheral devices, such as PCI/PCI-X bridge 205, and PCI/PCI-X devices 206–209. The bridge device 205 provides an interface between a primary bus 203 and a secondary bus 204 for coupling peripheral devices 206–209. Note that devices 206–209 are not limited to PCI/PCI-X devices. It will be appreciated that devices 206–209 may be implemented as other peripheral devices, such as, for example, PCI Express™ compatible devices.

According to one embodiment, bridge device 205 includes one or more programmable or configurable identification registers, such as, for example, vendor ID, device ID, and revision ID registers, which may be programmable during an initialization phase of system 200, such as preset time. During the initialization period of system 200, bridge device 205 detects a signal, such as a reset signal, received from the main system board 202, such as a chipset or microprocessor (e.g., processor 103 of system 100 shown in FIG. 1), indicating that an initialization occurs. In response to the initialization, predefined data for the configuration registers of device 205 is loaded into the configuration registers including at least identification register, such as vendor ID, device ID, and revision ID registers.

In one embodiment, during the transfer of the ID data, the host processor (e.g., the microprocessor) is prevented from accessing the configuration registers until the ID data has been transferred and loaded in the peripheral device. For example, when the peripheral device is a PCI device, the host processor may be prevented from accessing the configuration registers until a retry sequence has been completed. In this embodiment, the host processor will be substantially guaranteed that the host will not observe the default values rather than the newly programmed values. Note that the programming of the ID registers may occur without the retry behavior.

The predefined data may be stored in a memory, such as SROM 206, coupled to the bridge device 205. SROM 306 may be located within device 205. Alternatively, SROM 206 may be located outside of device 205, as shown in FIG. 2. According to one embodiment, SROM 206 may be shared between bridge device 205 and other peripheral devices, such as devices 207–209. According to one embodiment, devices 207–209 may also include one or more programmable identification registers (e.g., vendor ID, device ID, and revision ID registers, etc.). Each of the devices 207–209 may individually include a memory, such as SROM, to store the respective user predefine data that can be loaded into the respective configuration registers including at least one identification register. Alternatively, devices 207–209 may share SROM 206 with bridge device 205 to store their respective predefined data.

According to one embodiment, the predefined data may be stored in SROM 206 during manufacturing of the option card 201 or bridge device 205. Alternatively, the predefined data may be loaded into SROM 206 through a utility, such as a flash utility, that reads the predefined data from a file, such as text or script file, and writes the data into the SROM 206. An exemplary predefined data file is shown in the Appendix A of the present application.

According to one embodiment, the predefined data may be loaded into SROM 206 per application basis. For example, when option card 201 is about to be plugged into system slot 203 of system 200, a user may discover that the system software or a device driver of system 200 is looking for particular vendor ID, device ID, or revision ID of a peripheral device represented by option card 201. Accordingly, in order allow the option card 201 to be recognized by the system software or the device driver, the user may modify the predefined data file, similar to the one shown in Appendix A, to match the identification (e.g., vendor ID, device ID, or revision ID) the system software or the device driver is looking for, and load the modified predefined data file into SROM 206.

According to another embodiment, a use predefined data file may be provided by a vendor or manufacturer of option card 201 and the data file may be downloaded over a network from a remote facility via a network interface, such as network interface 110 of system 100 shown in FIG. 1. Other configurations may exist.

Thereafter, in one embodiment, system 200 may have to be rebooted to enter another initialization period. During the initialization phase (e.g., preset time), the bridge device 205 loads the predefined data from SROM 206 into its configuration registers, including at least one identification register (e.g., vendor ID, device ID, and revision ID registers). The predefined data may be loaded according to exemplary loading sequence 500 shown in FIG. 5. After the predefined data has been loaded into the configuration registers of device 205, the bridge device 205 may perform a verification process to verify whether the predefined data has been successfully loaded into the configuration registers. In one embodiment, the bridge device 205 may perform read operations from the configuration registers and compare the data with the data stored in SROM 206. Other mechanisms may exist.

Once the bridge device 205 has been successfully programmed using the predefined data from SROM 206, the bridge device 205 is enabled. In response to a query, such as bus re-enumeration or a query from the respective device driver, the enabled device 205 may respond using the programmed predefined data to identify itself as the device represented by the predefined data. As a result, the system software or the device driver recognizes the programmed device 205 without modifying the system software or the device driver.

Figure 3:
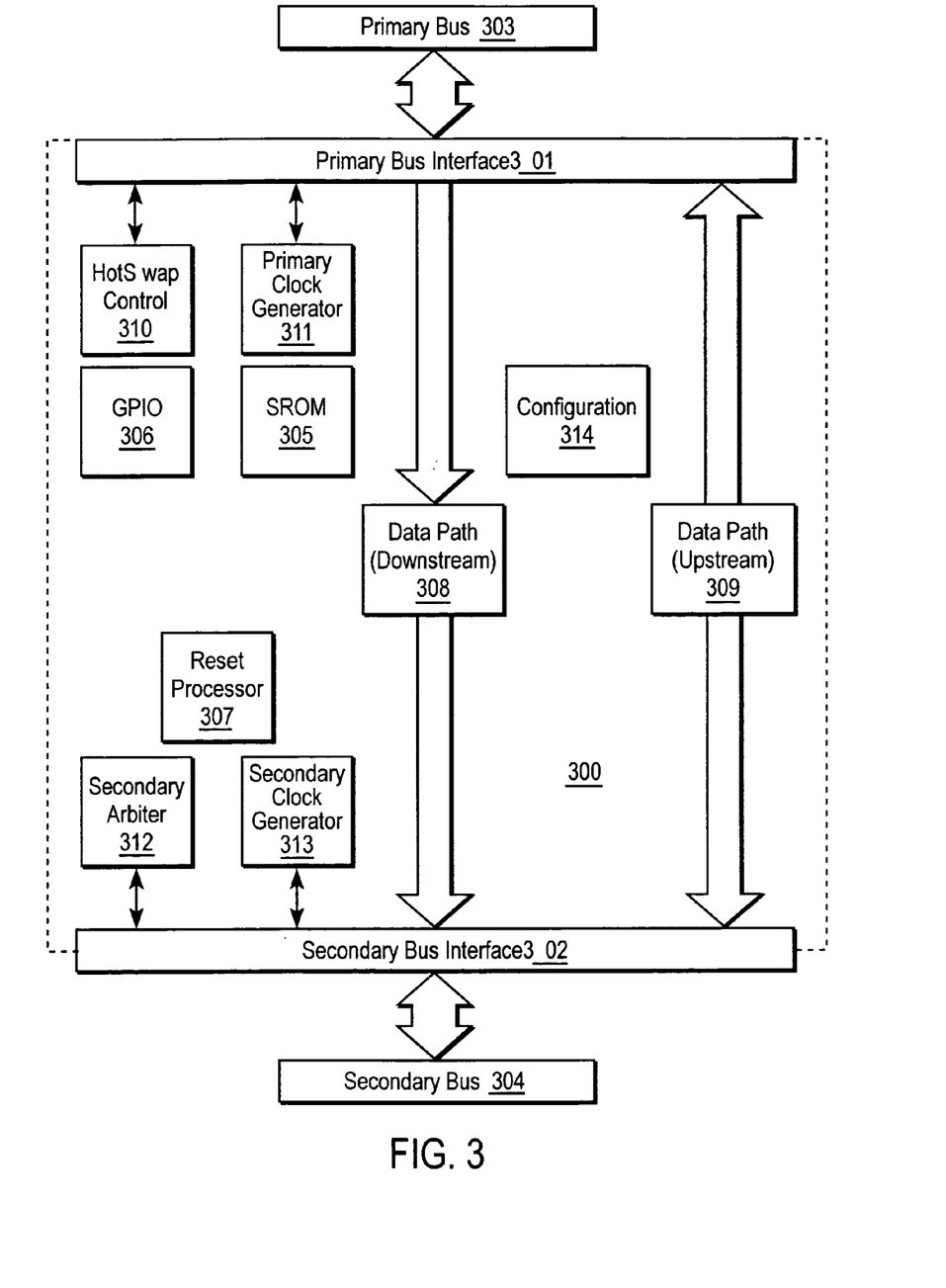
FIG. 3 is a block diagram illustrating an exemplary peripheral device having one or more configurable identification registers according to one embodiment.

FIG. 3 is a block diagram illustrating an exemplary peripheral bridge device having one or more programmable identification registers according to one embodiment. Exemplary bridge device 300 may be used as peripheral bridge device 205 of option card 201 shown in FIG. 2. In one embodiment, exemplary bridge device 300 includes a processor to perform one or more peripheral functions, one or more programmable configuration registers accessible by the processor, the one or more programmable configuration registers including at least one identification register for identifying the peripheral device, and a memory coupled to the processor to store predefined data, the predefined data being used to program the one or more programmable configuration registers including the at least one identification register in response to a configuration cycle of the peripheral device.

Referring to FIG. 3, peripheral device 300 includes a primary bus interface 301 and a secondary bus interface 302 to connect primary bus 303 and secondary bus 304 respectively. Primary bus 303 and secondary bus 304 may be PCI/PCI-X or PCI Express™ compatible buses and peripheral device 300 may be a PCI/PCI bridge or a PCI Express bridge. Primary bus interface 301 generally connects to an upstream bus 303 via an upstream data path 309. Secondary bus interface 302 generally attaches to a downstream bus 304 via downstream data path 308. Primary bus interface 303 may be used as host primary bus 203 and secondary bus 304 may be used as secondary PCI bus 204 shown in FIG. 2.

According to one embodiment, peripheral device 300 includes one or more programmable configuration registers, which includes at least one programmable identification register, such as, for example, vendor ID, device ID, and revision ID, etc. During an initialization process of peripheral device 300, which may be detected and processed by reset processor 307, predefined data may be read from a memory, such as SROM 305, and may be programmed into one or more configuration registers of peripheral device 300, including at least one identification register, instead of default configuration data. The predefined data may be loaded according to a loading sequence, similar to loading sequence 500 of FIG. 5. The predefined data may be loaded and stored in SROM 305 via a utility based on an input file defining the user data, similar to the one shown in Appendix A.

According to one embodiment, when peripheral device 300 detects that the device is in a reset state (e.g., P_RST# goes inactive, which may be detected by reset processor 307), a peripheral device 300 automatically executes a read from serial EEPROM (e.g., SROM 305). If the predetermined bit pattern is detected during the ROM load, the appropriate fields, including at least one identification field, of the configuration registers of peripheral device 300 are loaded with the predefined data read from SROM 305. In one embodiment, the bit pattern indicating that the predefined data is loaded includes the most significant bit (MSB) of the first byte having a logical one value, as shown in first byte 501 of load sequence 500 in FIG. 5. At the completion of the ROM load, a reset line (e.g., S_RST#) is de-asserted. Thereafter, peripheral device 300 is enabled and responds to ID configuration cycles by reporting an identification represented by the user provided data. In one embodiment, this behavior persists without requiring additional accesses to the ROM (e.g., SROM 305) or imposing additional latency until the next initialization cycle (e.g., P_RST# event), which reloads the ROM and begins the cycle again.

In one embodiment, during loading of the ID data, the host processor (e.g., the microprocessor) is prevented from accessing the configuration registers until the ID data has been completely transferred and loaded in the peripheral device. For example, when the peripheral device is a PCI device, the host processor may be prevented from accessing the configuration registers until a retry sequence has been completed. In this embodiment, the host processor will be substantially guaranteed that the host will not observe the default values rather than the newly programmed values. Note that the programming of the ID registers may occur without the retry behavior as described above.

Peripheral device 300 may further include other components, such as primary and secondary clock generators for asynchronous operations between primary bus 303 and secondary bus 304. Peripheral device 300 may further includes a hot swap control unit 310, GPIO (general purpose input and output) unit 306, secondary arbiter 312, and configuration unit 314. Hot swap control unit 310 allows the peripheral device 300 to be inserted or removed from primary bus 303 without requiring the system to be shut down. Secondary arbiter 312 handles arbitration to support multiple devices coupled to the secondary bus 304, such as, for example, peripheral devices 207–209 coupled to the secondary bus 204 shown in FIG. 2. Other components apparent to those with ordinary skill in the art, such as control logic or multiplexers, etc., may be included.

According to one embodiment, SROM 305 may be a 512-byte serial EEPROM that is used for loading the configuration space registers settings of a peripheral device (e.g., peripheral device 300) prior to host system discovery and initialization of the device. For example, SROM 305 interface may be compatible with industry standard 512-byte Microwire™ serial ROM, such as 93LC66A 512x8 serial EEPROM or equivalent, available from Microchip Technology, Inc. However, SROM 305 is not limited those discussed above. Other memory or configurations may be utilized.

In one embodiment, the SROM interface may include at least one of the interface signals:

| Name | Type | Description |
| --- | --- | --- |
| SR_CS | O | SROM chip select |
| SR_CLK | O | SROM clock |
| SR_DI | O | SROM data in |
| SR_DO | I | SROM data out |

Figure 4:
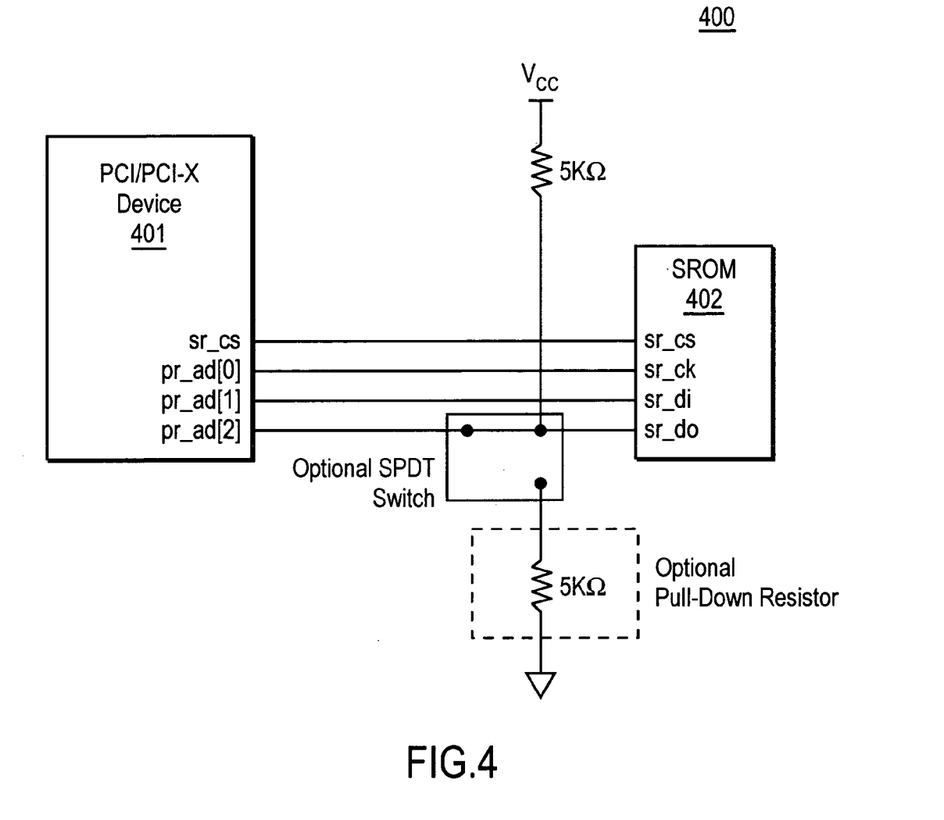
FIG. 4 is a block diagram illustrating an exemplary peripheral device having one or more configurable identification registers according to one embodiment.

FIG. 4 is a block diagram illustrating an exemplary configuration between a peripheral device and an SROM according to one embodiment. In one embodiment, exemplary configuration 400 includes a peripheral device 401 coupled with an SROM 402 via one or more SROM interface using at least one of the above interface signals.

FIG. 5 is a block diagram illustrating an exemplary loading sequence of an SROM image according to one embodiment. According to one embodiment, SROM image 500 may be present, but not desired to be loaded, which is indicated by one or more bit patterns. In a particular embodiment, if the SROM is present, but a register preload is not desired, bits [7:6] of the first byte 501 (e.g., the first two bits read) should be read as any value except the preload enable value, such as value of 10b (binary).

Figure 6:
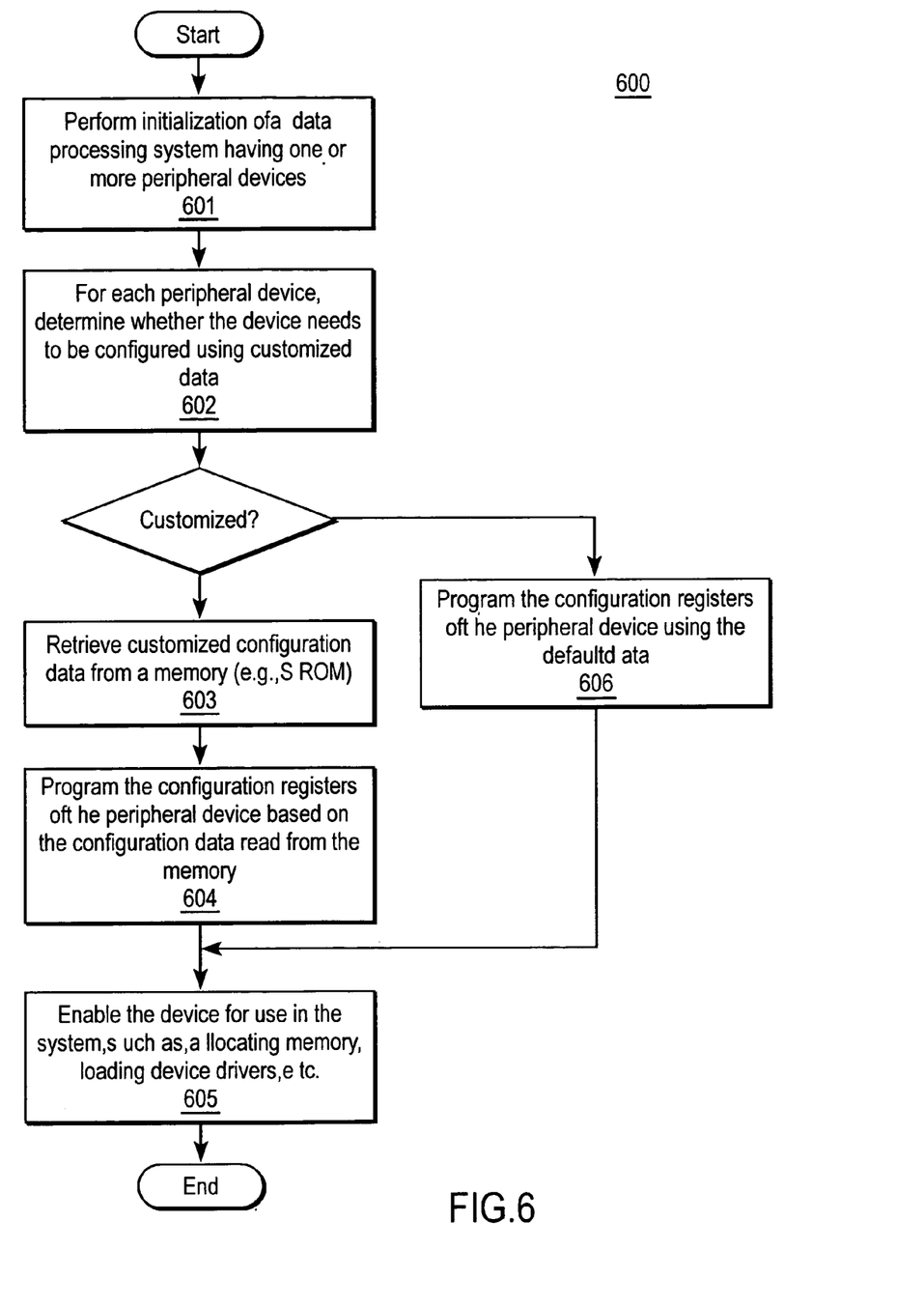
FIG. 6 is a flow diagram illustrating an exemplary process for programming a peripheral device according to one embodiment.

FIG. 6 is a flow diagram illustrating an exemplary process for programming one or more configuration registers including at least one identification register, according to one embodiment. Exemplary process 600 may be performed by a processing logic that may comprise hardware (circuitry, dedicated logic, etc.), software (such as is run on a general purpose computer system or a dedicated machine), or a combination of both. In one embodiment, exemplary process 600 includes programming, based on predefined data, one or more fields of configuration registers of a peripheral device in response to a configuration cycle of a data processing system, where the one or more fields of the configuration registers include at least one identification register for identifying the peripheral device. In one embodiment, exemplary process 600 may be performed by system software, such as, for example, BIOS, kernel of an operating system, or a device driver.

Referring to FIG. 6, at block 601, a data processing system start to perform an initialization process, such as power up or reboot process, the data processing system including one or more peripheral devices, such as PCI, PCI-X, or PCI Express™ compatible devices. At block 602, for each peripheral device, processing logic determines whether the respective peripheral device needs to be configured using predefined data. In one embodiment, the determination is performed based on whether there is a memory, such as ROM or SROM, associated with the peripheral device. Alternatively, the determination may be based on whether there is predefined data stored in the memory. Furthermore, even if there is predefined data stored in the memory, the determination is based on whether the predefined data is enabled, which may be based on one or more bit patterns of the data. In particular embodiment, the most significant bit of the first byte of the data image indicates that the data image is enabled.

If it is determined that the respective peripheral device needs to be programmed using predefined data, at block 603, processing logic retrieves the predefined data from the memory (e.g., SROM) and at block 604, the retrieved data is used to program one or more configuration registers of the peripheral device, including at least one of the identification registers, such as vendor ID, device ID, and revision ID, etc. Once the peripheral device has been successfully programmed, at block 605, the peripheral device is enabled for use in the data processing system, including, but not limited to, allocating memory and loading corresponding device driver or drivers for the peripheral device.

If it is determined that the respective peripheral device does not need to be programmed using predefined data, at block 606, a default data is loaded with the peripheral device. Other operations apparent to those with ordinary skills in the art may be included.

Thus, methods and apparatuses for programming identifications of a peripheral device have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

APPENDIX A

```
; This file will create an SROM image
; This loads the registers with their reset values
[
; preload enable (sets bit 7 for preload enable)
:0      80
:1      00
:2      00
:3      00
; Primary Class Code
:4      00
:5      80
:6      06
; Subvendor IDs
:7      46
:8      00
:9      11
:A      10
; Primary Min GNT, Max LAT
:B      00
:C      00
; Secondary Class Code
:D      00
:E      80
:F      06
; Secondary Min GNT,Max LAT
:10     00
:11     00
;Downstream Mem 0 -CSRs only (Set a 4K window size)
:12     00
:13     F0
:14     FF
:15     FF
; Downstream Mem I or I/O (Set 256 byte I/O window size)
:16     01
:17     FF
```

-continued

```
:18      FF
:19      FF
; Downstream Mem 2 (Set 8 MB memory window size)
:1A      08
:1B      00
:1C      80
:1D      FF
; Downstream Mem 3 (Set 8 MB memory window size)
:1E      08
:1F      00
:20      80
:21      FF
; Downstream Mem 3 Upper 32
:22      00
:23      00
:24      00
:25      00
; Expansion ROM (Set 1 MB expansion ROM size)
:26      01
:27      F0
; Upstream Mem 0 or 1/0 (Set 256 byte 1/0 window size)
:28      01
:29      FF
:2A      FF
:2B      FF
; Upstream Mem I (Set 8 MB memory window size)
:2C      08
:2D      00
:2E      80
:2F      FF
; Chip Control 0
:30      00
; clear lockout bit
:31      00
; Chip Control I
:32      00
; LUT disable
:33      00
; Arbiter control
:34      00
:35      02
; System error disable
:36      00
:37      00
; Power management
:38      00
:39      00
:3A      00
:3B      00
:3C      00
:3D      00
:3E      00
:3F      00
:40      00
:41      00
:42      00
]
```

What is claimed is:

1. A method, comprising:
programming, based on predefined data, one or more fields of configuration registers of a peripheral component interconnect (PCI) bridge device having a first identification (ID) during an initialization period of a data processing system, the programmed PCI bridge having a second ID different than the first ID, the one or more fields of the configuration registers including at least one identification register for identifying the PCI bridge device;
reporting the PCI bridge device identified by the second ID to the data processing system during a configuration cycle of the data processing system; and operating the PCI bridge device using at least one programmed identification register representing the second ID.

2. The method of claim 1, further comprising enabling the PCI bridge device in the data processing system after the programming, the PCI bridge device having the second ID derived from the at least one identification register programmed with the predefined data.

3. The method of claim 2, further comprising verifying content of the one or more programmed registers against the predefined data before enabling the PCI bridge device.

4. The method of claim 2, wherein the PCI bridge device is implemented as a part of a chipset of the data processing system.

5. The method of claim 1, further comprising retrieving the predefined data from a memory associated with the PCI bridge device during the initialization period of the data processing system prior to programming the peripheral device, content of the programmed at least one identification register being persistent until a next initialization period of the data processing system.

6. The method of claim 1, further comprising:
determining whether identification of the PCI bridge device needs to be programmed using the predefined data;
programming the at least one identification registers of the PCI bridge device using the predefined data, if the identification of the PCI Bridge device needs to be programmed using the predefined data; and
loading the at least one identification registers using default data if the PCI Bridge device's identification does not need to be programmed.

7. The method of claim 6, wherein whether the identification of the PCI bridge device needs to be programmed is determined based on one or more bit patterns of the predefined data.

8. The method of claim 1, wherein the at least one identification register includes at least one of vendor ID, device ID, and revision registers, and wherein the initialization period comprises a PRESET period of the data processing system.

9. The method of claim 1, further comprising configuring the at least one identification register as a read only register after the PCI bridge device is enabled in response to the configuration cycle of the data processing system.

10. The method of claim 1, further comprising detecting a reset signal received at the peripheral device, programming the one or more fields of configuration registers of the peripheral device using the predefined data being automatically performed in response to the reset signal.

11. A machine-readable storage medium having executable code to cause a machine to perform a method, the method comprising:
programming, based on predefined data, one or more fields of configuration registers of a peripheral component interconnect (PCI) bridge device having a first identification (ID) during an initialization period of a data processing system, the programmed PCI bridge having a second ID different than the first ID, the one or more fields of the configuration registers including at least one identification register for identifying the PCI bridge device;
reporting the PCI bridge device identified by the second ID to the data processing system during a configuration cycle of the data processing system; and
operating the PCI bridge device using at least one programmed identification register representing the second ID.

12. The machine-readable storage medium of claim 11, wherein the method further comprises enabling the PCI bridge device in the data processing system after the programming, the PCI bridge device having the second ID derived from the at least one identification register programmed with the predefined data.

13. The machine-readable storage medium of claim 12, wherein the method further comprises verifying content of the one or more programmed registers against the predefined data before enabling the PCI bridge device.

14. The machine-readable storage medium of claim 12, wherein the PCI bridge device is implemented as a part of a chipset of the data processing system.

15. The machine-readable storage medium of claim 11, wherein the method further comprises retrieving the predefined data from a memory associated with the PCI bridge device during the initialization period of the data processing system prior to programming the peripheral device, content of the programmed at least one identification register being persistent until a next initialization period of the data processing system.

16. The machine-readable storage medium of claim 11, wherein the method further comprises:
    determining whether identification of the PCI bridge device needs to be programmed using the predefined data;
    programming the at least one identification registers of the PCI bridge device using the predefined data, if the identification of the PCI Bridge device needs to be programmed using the predefined data; and
    loading the at least one identification registers using default data if the PCI Bridge device's identification does not need to be programmed.

17. The machine-readable storage medium of claim 16, wherein whether the identification of the PCI bridge device needs to be programmed is determined based on one or more bit patterns of the predefined data.

18. The machine-readable storage medium of claim 11, wherein the at least one identification register includes at least one of vendor ID, device ID, and revision registers, and wherein the initialization period comprises a PRESET period of the data processing system.

19. The machine-readable storage medium of claim 11, wherein the method further comprises configuring the at least one identification register as a read only register after the PCI bridge device is enabled in response to the configuration cycle of the data processing system.

20. The machine-readable storage medium of claim 11, wherein the method further comprises detecting a reset signal received at the peripheral device, programming the one or more fields of configuration registers of the peripheral device using the predefined data being automatically performed in response to the reset signal.

21. A PCI bridge device, comprising:
    a processor to perform one or more peripheral functions;
    one or more programmable configuration registers accessible by the processor, the one or more programmable configuration registers including at least one identification register for identifying the PCI Bridge device; and
    a memory coupled to the processor to store predefined data, the predefined data being used to program the one or more programmable configuration registers including the at least one identification register during an initialization period of the processor to change an identification (ID) of the PCI bridge device from a first ID to a second ID different than the first ID, wherein the PCI bridge device is represented using the second ID in response to a configuration cycle of the PCI bridge device, such that the PCI bridge device is configured to operate using the second ID during a normal cycle of the PCI bridge device.

22. The peripheral device of claim 21, wherein the at least one identification register includes at least one of vendor ID, device ID, and revision registers.

23. The peripheral device of claim 21, wherein the memory is a serial read-only memory (SROM).

24. A data processing system, comprising:
    one or more processors;
    a bus coupled to the one or more processors;
    a PCI bridge device coupled to the bus for interfacing a PCI bus the PCI bridge device including
        one or more functional units to perform one or more peripheral functions,
        one or more programmable configuration registers including at least one identification register for identifying the respective PCI Bridge device, and
        a memory to store predefined data, the predefined data being used to program the one or more programmable configuration registers including the at least one identification register during an initialization period of the processor to change an identification (ID) of the PCI bridge device from a first ID to a second ID different than the first ID, wherein the PCI bridge device is represented using the second ID in response to a configuration cycle of the PCI Bridge device, such that the PCI bridge device is configured to operate using the second ID during a normal cycle of the PCI bridge device.

25. The data processing system of claim 24, wherein the at least one identification register includes at least one of vendor ID, device ID, and revision registers.

26. The data processing system of claim 24, wherein the memory is a serial read-only memory (SROM).

27. The data processing system of claim 24, wherein the PCI Bridge device is implemented as a part of a chipset of the data processing system.

* * * * *